(12) United States Patent
Fu et al.

(10) Patent No.: US 7,743,158 B2
(45) Date of Patent: Jun. 22, 2010

(54) ACCESS NETWORK DYNAMIC FIREWALL

(75) Inventors: Guangrui Fu, Sunnyvale, CA (US); Daichi Funato, Mountain View, CA (US); Toshiro Kawahara, Saratoga, CA (US); Jonathan Wood, Redwood City, CA (US)

(73) Assignee: NTT DOCOMO, Inc., Tokyo (JP)

( * ) Notice: Subject to any disclaimer, the term of this patent is extended or adjusted under 35 U.S.C. 154(b) by 1021 days.

(21) Appl. No.: 10/310,164

(22) Filed: Dec. 4, 2002

(65) Prior Publication Data
US 2004/0111519 A1 Jun. 10, 2004

(51) Int. Cl.
G06F 15/16 (2006.01)

(52) U.S. Cl. .................. 709/229; 709/217; 709/218; 709/219; 709/227

(58) Field of Classification Search ......... 709/217–219, 709/227, 229 Z, 229
See application file for complete search history.

(56) References Cited

U.S. PATENT DOCUMENTS

| | | | | |
|---|---|---|---|---|
| 5,864,683 A * | 1/1999 | Boebert et al. | ............... | 709/249 |
| 6,070,243 A * | 5/2000 | See et al. | ............... | 726/2 |
| 6,269,393 B1 * | 7/2001 | Yost et al. | ............... | 709/201 |
| 6,330,562 B1 * | 12/2001 | Boden et al. | ............... | 707/10 |
| 6,587,466 B1 * | 7/2003 | Bhattacharya et al. | . | 370/395.21 |
| 6,611,863 B1 * | 8/2003 | Banginwar | ............... | 709/220 |
| 6,671,682 B1 * | 12/2003 | Nolte et al. | ............... | 707/5 |
| 6,769,000 B1 * | 7/2004 | Akhtar et al. | ............... | 707/103 R |
| 6,772,332 B1 * | 8/2004 | Boebert et al. | ............... | 713/153 |
| 6,904,449 B1 * | 6/2005 | Quinones | ............... | 709/203 |
| 6,944,183 B1 * | 9/2005 | Iyer et al. | ............... | 370/466 |
| 6,954,790 B2 * | 10/2005 | Forslow | ............... | 709/227 |
| 7,185,067 B1 * | 2/2007 | Viswanath et al. | ............... | 709/217 |
| 7,237,258 B1 * | 6/2007 | Pantuso et al. | ............... | 726/11 |
| 2002/0065938 A1 * | 5/2002 | Jungck et al. | ............... | 709/246 |
| 2002/0081971 A1 * | 6/2002 | Travostino | ............... | 455/41 |
| 2002/0157023 A1 * | 10/2002 | Callahan et al. | ............... | 713/201 |
| 2003/0014644 A1 * | 1/2003 | Burns et al. | ............... | 713/182 |
| 2003/0084331 A1 * | 5/2003 | Dixon et al. | ............... | 713/200 |
| 2003/0115346 A1 * | 6/2003 | McHenry et al. | ............... | 709/229 |
| 2003/0195957 A1 * | 10/2003 | Banginwar | ............... | 709/223 |
| 2004/0042470 A1 * | 3/2004 | Cooper et al. | ............... | 370/401 |
| 2004/0111461 A1 * | 6/2004 | Claudatos et al. | ............... | 709/200 |

(Continued)

OTHER PUBLICATIONS

Steven M. Bellovin, "Distributed Firewalls," ;login:, pp. 37-39, Nov. 1999.

(Continued)

*Primary Examiner*—Nathan Flynn
*Assistant Examiner*—Mohamed Wasel
(74) *Attorney, Agent, or Firm*—Haynes and Boone LLP (57) ABSTRACT

A network system includes a network edge point configured to provide a terminal with access to a network. The network edge point includes a security policy associated with the terminal, and controls communications between the network and the terminal according to the security policy. The security policy may include a personal filter downloaded from the terminal, a service filter downloaded from a service policy server, and/or a domain filter downloaded from a domain policy server. The terminal may access the network through a second network edge point. The second network edge point may download one or more of the filters from the first network edge point, and control communications between the network and the terminal according to the security policy.

26 Claims, 6 Drawing Sheets

U.S. PATENT DOCUMENTS

| | | | |
|---|---|---|---|
| 2005/0021863 A1* | 1/2005 | Jungck | 709/246 |
| 2006/0015935 A1* | 1/2006 | Dixon et al. | 726/11 |
| 2006/0020715 A1* | 1/2006 | Jungck | 709/246 |
| 2006/0029104 A1* | 2/2006 | Jungck | 370/498 |
| 2006/0037071 A1* | 2/2006 | Rao et al. | 726/13 |
| 2006/0075139 A1* | 4/2006 | Jungck | 709/245 |
| 2006/0112427 A1* | 5/2006 | Shahbazi | 726/16 |
| 2006/0167858 A1* | 7/2006 | Dennis et al. | 707/3 |
| 2006/0168213 A1* | 7/2006 | Richardson et al. | 709/225 |
| 2006/0168258 A1* | 7/2006 | Spicer et al. | 709/229 |
| 2006/0274774 A1* | 12/2006 | Srinivasan et al. | 370/420 |
| 2007/0150938 A1* | 6/2007 | Moon et al. | 726/2 |
| 2007/0204333 A1* | 8/2007 | Lear et al. | 726/6 |
| 2008/0134286 A1* | 6/2008 | Amdur et al. | 726/1 |
| 2008/0313273 A1* | 12/2008 | Wang | 709/203 |
| 2009/0006584 A1* | 1/2009 | Gregoire et al. | 709/220 |

OTHER PUBLICATIONS

Sotiris Ioannidis, Angelos D. Keromytis, Steve M. Bellovin, Jonathan M. Smith, "Implementing a Distributed Firewall," *CCSI*, 2000, Athens, Greece.

Charles Payne, Tom Markham, "Architecture and Applications for a Distributed Embedded Firewall," *Secure Computing Corporation website*.

Junbiao Zhang, Jun Li, Stephen Weinstein, Nan Tu, "Virtual Operator based AAA in Wireless LAN Hot Spots with Ad-hoc Networking Support," *Mobile Computing and Communications Review*, vol. 6, No. 3.

* cited by examiner

ACCESS NETWORK DYNAMIC FIREWALL

FIELD OF THE INVENTION

The present invention relates generally to a network firewall, and more particularly to a method and system for providing a network firewall with multi-tiered access filters that reside at a network edge point.

BACKGROUND OF THE INVENTION

A network firewall is a network access control system that protects both users and the network itself from unauthorized access and malicious attacks. A traditional firewall is implemented at a network gateway to filter traffic passing through the gateway according to a security policy. A traditional firewall splits a network into an internal portion, which is behind the firewall, and an external portion, which is outside of the firewall. Internal traffic is defined as communications between users attached to the internal portion of the network. Internal traffic does not pass through the firewall, and is not affected by the security policy. Therefore, a traditional firewall cannot protect systems that are behind the firewall from each other. A traditional firewall is sometimes referred to as a perimeter firewall.

Users today may access a plethora of different networks. For example, a user may transport and connect a terminal to a residential network, an office network, an airport network, a cyber café network, or the like. Other users having terminals connected to, for example, a cyber café network, may not be trustworthy. The assumption, on which a traditional firewall is based, that users behind the firewall may trust each other, is no longer valid.

In a traditional firewall, a security policy is defined and enforced by a network administrator at some central point, such as a network gateway. Users may not be free to choose which traffic is enabled or disabled for their terminals, even though different users may have different network access preferences and requirements. A centralized network security policy defined by a network administrator may not meet the requirements of each individual user.

For example, an enterprise firewall may be deployed at an enterprise gateway. When users move their terminals from the enterprise network to other networks, they may be without any protection. Furthermore, the enterprise firewall policy may block their access to the internal network from outside the firewall, without remedial measures, such as a Virtual Private Network (VPN) implementation.

Distributed firewalls for terminals, or for network interface cards, have been proposed. A distributed firewall implementation essentially places a firewall around each terminal. Distributed firewalls may protect users on a common network from each other. However, there are other issues that distributed firewalls may not address. First, unauthorized packets are not dropped until the packets reach a terminal, so network bandwidth, which is especially valuable in a wireless network, is wasted. Second, a network using a distributed firewall may be forced to depend upon each terminal to control the firewall. Third, a network using a distributed firewall may have to trust a terminal to charge itself a network usage fee.

SUMMARY OF THE INVENTION

A network system includes a network having a network edge point configured to provide access to the network. The network system also includes a terminal coupled to the network edge point that communicates with the network via the network edge point. The network edge point includes a security policy associated with the terminal, and controls network communications between the network and the terminal according to the security policy.

The terminal may transmit a personal filter to the network edge point. The network edge point may integrate the personal filter into the security policy. The personal filter is may be defined by a user of the terminal. The personal filter is may also be a default filter defined by a network administrator.

The network system may also include a domain policy server coupled to the network. The domain policy server may include a domain filter. The domain policy server may transmit the domain filter to the network edge point. The network edge point may integrate the domain filter into the security policy. Alternatively, the network edge point may include a domain filter. The network edge point may integrate the domain filter into the security policy.

The network system may also include a service policy server coupled to the network. The service policy server may include a service filter. The service policy server may transmit the service filter to the network edge point. The network edge point may integrate the service filter into the security policy.

A method of securing communications in a network includes the step of sending a service filter from a service policy server to a network edge point. The method also includes the steps of sending a personal filter from a terminal to the network edge point, and integrating the service filter and the personal filter into an integrated filter table. The method further includes the steps of filtering traffic at the network edge point according to the integrated filter table.

A method of securing communications in a network includes the step of sending a personal filter from a terminal to a first network edge point, and sending the personal filter from the first network edge point to the second network edge point. The method also includes the step of filtering traffic at the second network edge point according to the personal filter.

DETAILED DESCRIPTION OF THE PRESENTLY EMBODIMENTS

The present invention provides a system for security in a network. The system may filter packets at a point where a terminal accesses the network, which is referred to herein as a network edge point (NEP). The system may filter packets according to a security policy. The security policy may be defined in part by the terminal, and in part by one or more network administrators. The term "packet" is used herein to refer to a data packet, a datagram, or any other type of network message. Packets affected by the security policy may be either bound for the terminal, or originating at the terminal. The present invention may be implemented with virtually any NEP.

Because packets are filtered at the NEP, the terminal is protected from all unauthorized packets arriving from the network, and the network is protected from all unauthorized packets arriving from the terminal. Furthermore, network bandwidth usage is minimized because unauthorized packets do not travel between the NEP and the terminal. Minimizing the bandwidth usage in the "final hop" is particularly important where the connection between the NEP and the terminal is wireless, dial-in, or some other type of connection having limited or valuable bandwidth.

The system may filter packets according to a security policy. The security policy may be implemented as a collection of filters. The filters may be stored in one or more filter tables. Each filter may include a seven-tuple having a source address, a destination address, a source port, a destination port, a protocol, a life time, and an action. Alternatively, each filter may include a subset of the seven-tuple. For example, a filter may include only a source address, or only a destination port. The filters in a filter table may be specified in a generic high level language, such as, for example extended markup language (XML). An exemplary filter table is shown in Table 1.

TABLE 1

| SRC ADDR | DEST ADDR | SRC Port | DEST Port | Protocol | Life-time | Action |
|---|---|---|---|---|---|---|
| 82.48.42.112 | 82.68.42.56 | Any | 21 | IP | 0 | Deny |
| 82.48.42.112 | Any | Any | 135 | IP | 1 | Allow |
| Any | 82.48.42.112 | 135 | Any | IP | Default | Pending |

Each row in Table 1 represents a filter. The first column represents the source address for a packet. The second column represents the destination address for a packet. The source and destination addresses may each be an internet protocol (IP) address, a media access control (MAC) address, a telephone number, or some other address used to identify a terminal.

The third column in Table 1 represents a source port for a packet. The fourth column represents a destination port for a packet. The source and destination ports may each be, for example, a transmission control protocol (TCP) port number, a user datagram protocol (UDP) port number, a service access port (SAP) number, or some other type of port used for identifying a connection location at a terminal. An SAP port is different from a TCP or UDP port. An SAP port is a "higher level" logical concept. An SAP port may be mapped to one or more TCP ports, UDP ports, or IP flows to identify a data service, such as a video on demand, that may use multiple ports to communicate an integrated message.

The fifth column represents the protocol affected by the filter. The protocol may internet protocol (IP), Ethernet, network basic input output system (NetBIOS), NetBIOS Extended User Interface (NetBEUI), Internet Packet Exchange (IPX), AppleTalk, DECNet, or the like. Additionally, the protocol may be a digital mobile telephony protocol such as general packet radio service (GPRS), global system for mobile communications (GSM), a data protocol over a time division multiple access (TDMA) or a code division multiple access (CDMA) network, or the like.

The sixth column represents the lifetime of the filter. Each filter may have an infinite lifetime, a default lifetime, or a specified lifetime. An infinite lifetime indicates a filter will endure until explicitly removed. An infinite lifetime maybe indicated by a value of, for example, any negative number. A default lifetime may be set that will be applied to each new filter that does not have a specific lifetime. A specified lifetime is a lifetime chosen by a user or an administrator.

The seventh column represents an action to be taken by the filter for a packet meeting the criteria of the first five columns. The action may be "allow", "deny", "reject", or "pending". If the action is "allow", all packets meeting the criteria for that filter will be allowed to pass. If the action is "deny", all packets meeting the criteria for that filter will be prevented from passing, and automatically and silently discarded. If the action is "reject", all packets meeting the criteria for that filter will be prevented from passing, and a notification message will be sent to the user.

The "pending" action provides a method for handling unexpected packets (unknown traffic), or packets which may be suspect or deserving of special handling for other reasons. Filters with the action "pending" may cause the NEP to send an access notification message indicating the source and destination addresses and ports of the unexpected packet. The access notification message may be sent to a policy server and/or a terminal associated with the owner of the filter. For example, a terminal is associated with a user, and a domain policy server is associated with a domain administrator.

A packet may satisfy the criteria of two or more filters having a "pending" action. In this case, an access notification message may be sent to each policy server or terminal involved. The packet may be blocked until each policy server or terminal agrees to allow the packet to pass. A policy server may have an automated response for an access notification message. A terminal, however, may automatically create a filter based on a user indication to allow or deny the unexpected packet. This filter may be stored in a personal filter table. Alternatively, the terminal may store an automated response for responding to future access notification messages with the same criteria.

A security policy for a terminal may be defined in part by a user of a terminal and in part by an administrator of the network. Furthermore, a security policy may be defined in part by more than one user and by more than one administrator. An embodiment of the present invention may have filters for a single terminal created by three, four, five or any other number entities.

For the illustrative embodiment described herein, three entities may create and own filters: a terminal user, a network service provider, and a domain administrator. The network service provider may provide the user access to network services for a fee. The domain administrator may provide the user with access to a network, and may charge the user a fee either directly, or indirectly via the network service provider.

In one embodiment, only the owner of a filter may modify or delete the filter. Alternatively, the owners may be arranged in a hierarchy. In a hierarchical arrangement, owners with higher permissions may be allowed to modify or delete the filters of owners with lower permissions. For example, a network service provider may have higher permissions than a user.

Filters created by a user are known collectively as a personal filter table. The personal filter table may include filters specified by the user for the desired protections. For example, the personal filter table may include a filter a blocking all incoming "ping" packets. A personal filter table may be maintained on a terminal. When the user creates, deletes, or modifies a filter, two events may occur. First, the terminal may update a copy of the personal filter table stored on the terminal. Second, the terminal may update a copy of the personal filter table stored on a NEP. For example, the terminal may send an update message to the NEP, and the NEP may update a copy of the personal filter table stored on the NEP.

Filters created by a domain administrator are known collectively as to a domain filter table. The domain filter table may include filters specified by the domain administrator for the protection of all terminals in the domain. For example, the domain filter table may include a filter for blocking all incoming packets with a destination port of 31337, the default listening port of the Back Orifice Trojan horse.

Filters created by a network service provider are known collectively as a service filter table. The service filter table may include filters specified by the network service provider based on the service contract between a user and the service provider. For example, a user may pay for e-mail access, but not for World Wide Web access. In this case, the service filter table may include a filter blocking packets from the user's terminal having a destination port of 80.

The collection of all filters for a terminal is known as an integrated filter table. The integrated filter table includes filters from the service filter table, the domain filter table, and the personal filter table. An illustrative integrated filter table for a terminal is shown in Table 2.

TABLE 2

| Owner | SRC Address | DEST Address | SRC Port | DEST Port | Protocol | Lifetime | Action |
|---|---|---|---|---|---|---|---|
| User | 82.48.42.112 | 82.68.42.56 | Any | 21 | IP | 300 | Deny |
| Service | 82.48.42.112 | Any | Any | 135 | IP | 0 | Allow |
| Domain | Any | 82.48.42.112 | 135 | Any | IP | Default | Reject |
| Domain | Any | 75.48.42.3 | Any | Any | IP | Default | Pending |

As shown in Table 2, the integrated filter table includes a collection of filters, and indicates an owner for each filter. The filter in the first row of Table 2 is owned by the user of the terminal. The filters in the second, third and fourth rows of Table 2 are owned by the user's service provider and a domain administrator, respectively. Except for the column indicating in the owner of a filter, the format of the remaining columns of the integrated filter table is the same as the format of the "regular" filter table shown in Table 1.

Figure 1:
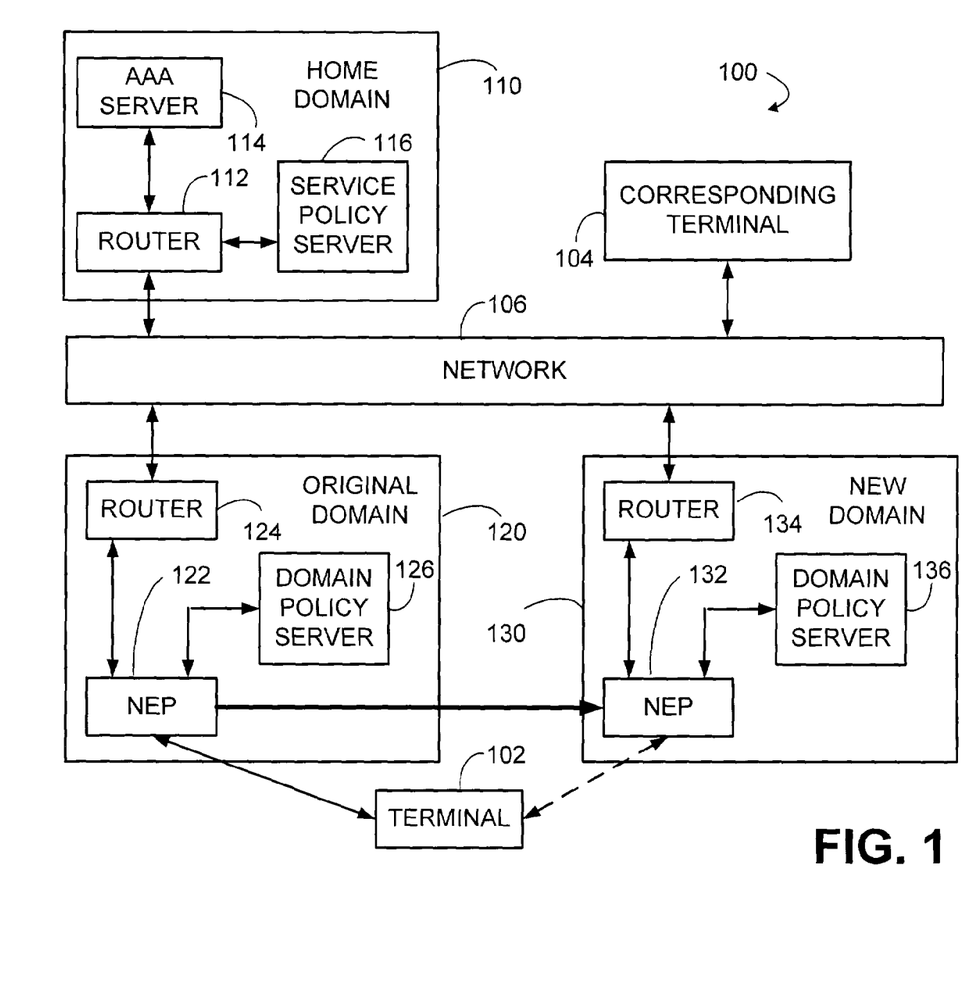
FIG. 1 is a system-level block diagram of a network system.

FIG. 1 is a system level block diagram of a network system 100. The network system 100 may be any computing environment where one or more terminals communicate with one or more other terminals. The configuration of the network system 100 shown in FIG. 1 is merely illustrative. The network system 100 includes: a terminal 102, a network 106, a home domain 110, a first foreign domain 120, a second foreign domain 130, and a corresponding terminal 104. Even though elements of the network system 100 are shown as directly coupled in FIG. 1, the elements may be indirectly coupled and separated geographically. The simplified coupling is shown in order to more clearly illustrate communication paths.

The terminal 102 may communicate with the corresponding terminal 104 via the first foreign domain 120 and the network 106. There may be an on-going communication between the terminal 102 and the corresponding terminal 104. The network 106 may be a global network, such as the Internet, a wide area network (WAN), or a local area network (LAN). The network 106 is a core network, whereas the domains 120 and 130 are access networks. The domains 120 and 130 may include 802.11a/b networks, LANs, WANs, satellite networks, Bluetooth networks, or other types of networks.

The terminal 102 and the corresponding terminal 104 may each be a desktop computer, a server, a laptop computer, a personal digital assistant (PDA), a pocket PC, a wireless telephone, or some other communications enabled device. The terminals 102 and 104 may each be configured as a client, as a server, or as a peer for peer-to-peer communications. Peer-to-peer communications may include voice over IP (VoIP), video teleconferencing, text messaging, file sharing, video streaming, audio streaming, or other direct communications. The terminals 102 and 104 may be capable of wireless communications. The terminal 102 and the corresponding terminal 104 may each have a memory including instructions for operation.

The home domain 110 maybe a domain operated by a network service provider that provides network service for the terminal 102. The domain 110 is referred to herein as the "home" domain 110 because it is a domain with which the terminal 102 is associated. The home domain 110 may include an authentication, authorization, and accounting (AAA) server 114, a router 112, and a domain service policy server 116.

The AAA server 114 may have a memory including codes segments and instructions for operation. The AAA server 114 may be a "home" AAA server for the terminal 102. As such, the AAA server 114 may authenticate the terminal 102 for access to various network domains. The AAA server 114 may include an authentication server that maintains information regarding the identification, authorization, and billing of the terminal 102. The credentials or the identities of the terminal 102 may be verified by the AAA server 114. Also, whether the terminal 102 is authorized to access a resource, such as a network, may be determined by the AAA server 114.

After authorizing the terminal 102, the AAA server 114 may track (account for) resources utilized by the terminal 102. For example, the AAA server 114 may track metrics regarding access of a network by the terminal 102. Information regarding resource utilization by the terminal 102 may be provided to the AAA server 114 by an outside source.

The router 112 may route packets. The router 112 may be capable of determining a next network node to which a received packet should be forwarded. A network node may be a terminal, a gateway, a bridge, or another router. The router 112 may be coupled to other sub-networks or domains, and provided a route for packets between the home domain 110 and the other domains.

The service policy server 116 may store a security policy for the home domain 110. The service policy server may store a service filter table for each terminal associated with home domain 110. The service policy server 116 may respond to requests from NEPs. For example, when a terminal authenticates to an NEP, the NEP may request a service filter table for that terminal from the service policy server 116. The service policy server 116 may be integrated with or located with the AAA server 114.

The original domain 120 and the new domain 130 may each be a domain operated by a service provider. In the illustrative embodiment that is described herein, the terminal 102 is first associated with NEP 122 of the original domain 120, and is later associated with the NEP 132 of the new domain 130. The names "new" and "original" were chosen to indicate the movement of the terminal 102 from one (original) domain to the other (new) domain. Essentially the same process occurs when the terminal 102 moves from the home domain 110 to the original domain 120, or between any two domains.

The domains 120 and 130 may have no innate knowledge of the terminal 102. However, the domains 120 and 130 may allow the terminal 102 to access the network 106. The domains 120 and 130 may authenticate the terminal 102 via the AAA server 114 before allowing access to the network 106. Network resources utilized by the terminal 102 may be tracked by the domains 120 and 130 on behalf of the AAA server 114. The owner of the NEP 122 or 132 may charge a network access fee based not only on bandwidth consumption or network time usage, but also based on the service access port (SAP) where the consumption occurred. The rate may be different for different SAPs.

The routers 124 and 134 may route packets in the same manner as the router 112. Similarly, the domain policy servers 126 and 136 may store the respective security policies for the domains 120 and 130 in the same manner as the service policy server 116. The NEPs 122 and 132 may each be virtually any networked edge point. For example, the NEPs 122 and 132 may each be an access point in wireless local area network (WLAN), a hub in an Ethernet network, or a point-to-point protocol (PPP) server of an internet service provider (ISP), business enterprise, or other dial-up network. A block diagram of the functional modules of an NEP is shown in FIG. 2.

Figure 2:
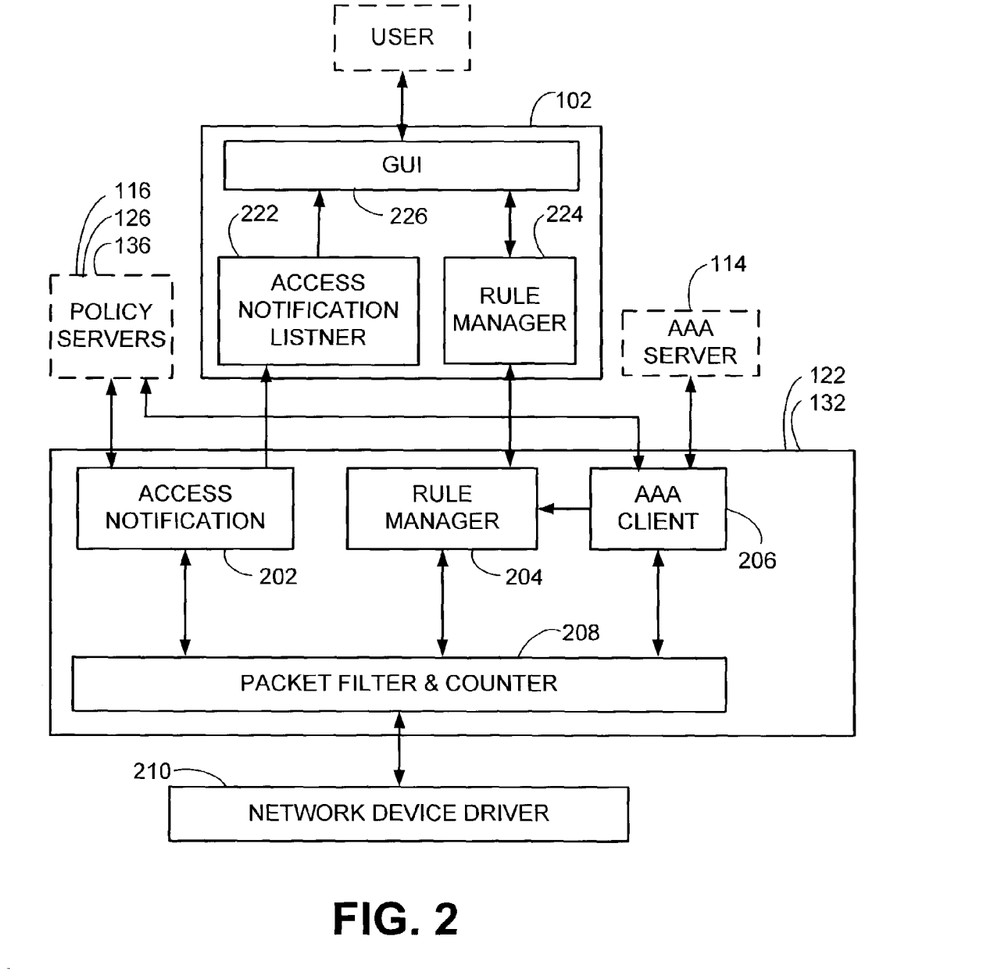
FIG. 2 is a block diagram of functional modules of network edge points and functional modules of a terminal.

FIG. 2 is a block diagram of the functional modules of NEPs 122 and 132, and of terminal 102. The terminal 102 includes three main functional modules, a graphical user interface (GUI) 226, an access notification listener 222, and a rule manager 224. A user may utilize the GUI 226 to interactively configure personal filters as desired, such as to allow or deny certain access. For example, the user may view and modify the filters contained in a personal filter table.

For another example, the user may be prompted via the GUI 226 when a filter in a personal filter table is about to expire. The user may be asked whether to renew the lifetime of the filter. If there is no response from the user until after the filter expires, or the user does not want to renew the filter, a filter table update message may be sent from the terminal 102 to the NEP 122 or 132 to delete the rule.

The access notification listener 222 listens for an access notification message from the currently associated NEP 122 or 132. When the access notification listener 222 receives an access notification message, the access notification listener 222 may query the user through the GUI 226 whether to allow, deny, or reject the upcoming unexpected network traffic. The rule manager 224 may maintain and update the filters in the personal filter table. The personal filter table may be unique to a user rather than unique to the terminal 102.

Each NEP 122 and 132 includes four main functional components. The functional components are: an access notification module 202, a rule manager 204, an AAA client 206, and a packet filter and counter 208. The access notification module 202 may detect, and notify filter owners of, any unexpected attempts to access the terminal 102. For example, packets matching the criteria of a filter having an action of pending, or unexpected packets, may arrive from a network device driver 210 of the NEP 122 or 132. The access notification module 202 may send an access notification message to the filter owner, to the terminal 102, or to another appropriate entity, and allow, deny, or reject the access to the terminal 102 based on the response.

The AAA client 206 may communicate with the AAA server 114 to authenticate and authorize the terminal 102 to access the network 106. Additionally, the AAA client 206 may download domain and service filter tables for the terminal 102 from the domain policy servers 126 and 136 and from the service policy server 116. There may be one domain filter table that includes entries for all terminals 102, such as a pre-configured network administrator defined filter table. The AAA client 206 may also be responsible for updating the AAA server 114 regarding network resources utilized by the terminal 102 for accounting and billing purpose.

The rule manager 224 may download a personal filter table of the terminal 102. The rule manager 224 may also receive domain and service filter tables from the AAA client 206. The rule manager 224 may integrate the personal, service, and domain filter tables into an integrated filter table for the terminal 102.

The packet filter and counter 208 may filter packets according to the filters in the integrated filter table. The packet filter and counter 208 may enforce filters owned by network administrators before filters owned by users. Additionally, the filters owned by the home domain 110 administrator may be enforced before the filters owned by the domain 120 and 130 administrators. The packet filter and counter 208 may also count packets to determine the network resources utilized by the terminal 102 for accounting and billing purpose.

Each NEP 122 and 132 may interpret filters into a language understood by a firewall tool existing in the operating system of the NEP 122 or 132. For example, the operating system of the NEP 122 or 132 may be a FreeBSD operating system or a Linux operating system, and may include IPFW or IPCHAIN, respectively. Each NEP 122 and 132 may also convert a filter from a logic concept to an actual network topology.

Figure 3:
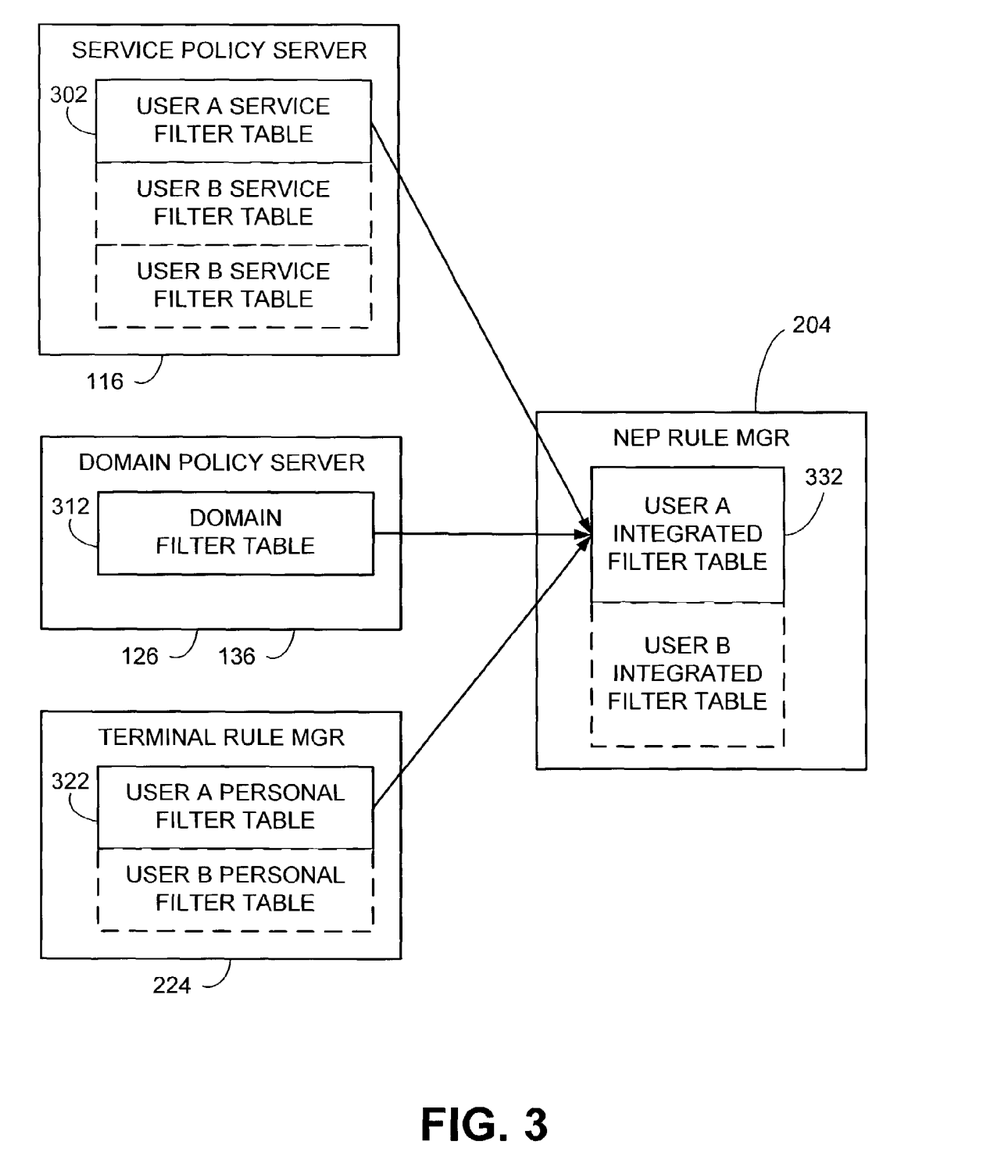
FIG. 3 is a block diagram showing interactions between a service policy server, a domain policy server, a terminal rule manager, and a network edge point rule manager.

FIG. 3 is a block diagram of the interactions between the service policy server 116, the domain policy server 126, the terminal rule manager 224, and NEP rule manager 204. When the terminal 102 first associates with NEP 122 of the original domain 120, the NEP 122 creates an integrated filter table 332 for the user of terminal 102. The downloading and creation of the integrated filter table 332 may occur in any order, and the order disclosed herein is merely illustrative.

First, the rule manager 204 of the NEP 122 downloads the service filter table 302 from the service policy server 116. Next, the rule manager 204 downloads the domain filter table 312 from the domain policy server 126. It may be desirable for the rule manager 204 to store a copy of the domain filter table 312, because the domain filter table 312 may not be unique to a user. Alternatively, the domain filter table 312 may be stored exclusively on the NEP 122, thereby eliminating the need for a domain policy server 126. Finally, the rule manager 204 downloads a personal filter table 322 for the user from the rule manager 224 of the terminal 102.

Referring to FIG. 1, the terminal 102 may change its association from the original domain 122 to the new domain 130. When this change occurs, the personal filter table 322 and the service filter table 302 stored on the NEP 122 may be transferred directly to NEP 132, as shown. This transfer may conserve valuable bandwidth between the terminal 102 and the NEP 132. As indicated above, the domain filter table 312 may not be unique to a user, and therefore may already reside on the NEP 132. Therefore, the domain filter table 312 may not need to be transferred. However, the entire integrated filter table 332 may be transferred. As another alternative, the personal filter table 322 may be transferred from the NEP 122 and the service filter table 302 may be transferred from the service policy server 116.

A preferred embodiment of a message set for defining and transferring filter tables will now be described. While this embodiment is a preferred embodiment, a number of embodiments for performing these tasks equally well exist. The description contained herein is not intended to limit the claimed invention in any way. Encryption may be used to protect the messages from being modified or read by unauthorized users.

Six messages are defined for transferring a filter table between the terminal 102 and the NEP 122, and between the old NEP 122 and the new NEP 132. The detailed function and format for each message is described below. Each message may use UDP datagrams, and may be secure (encrypted) during transfer and uploading. The NEPs 122 and 132, and the terminal 102 may perform integrity check upon receiving each message. The first message is a filter table upload request message, shown in Table 3. The four fields shown in Table 3 are common among most of the messages.

TABLE 3

| IP | UDP | CMD | SEQ |
| --- | --- | --- | --- |

The first field is an IP header. The second field a UDP header. The third field indicates a command (CMD), and may contain two bytes of information. These three fields indicate the same type of information in each of the six messages. The fourth field (SEQ) is the sequence number of the message in a communication sequence, and may be a two byte number indicating the sequence number.

The first message is a filter table upload request message, which is formatted as shown in Table 3. For the filter table upload request message, the CMD field is equal to "0" or "1". A CMD field equal to "1" indicates that the NEP 132 should upload the personal filter table 322 from terminal 102. A CMD field equal to "0" indicates that the NEP 132 may upload the personal filter table 322 from either the terminal 102 or from the previous NEP 122.

In operation, the terminal 102 initially physically connects, via a wired or a wireless connection, to the NEP 122. At this time, the terminal 102 may be authenticated to access the network 106 via the NEP 122. The NEP 122 may send a filter table upload request message to the terminal 102 to acquire the personal filter table 322 during or after authentication.

The second message is a filter table update message, shown in Table 4. The terminal 102 and the NEP 122 first create a security association (mutual authentication). Thereafter, when the terminal 102 receives a filter table upload request message from the rule manager 204, the terminal 102 uploads or updates personal filter table 322 to the NEP 122 using filter table update messages. The terminal 102 may wait for an upload/update acknowledgement message back from the NEP 122, and may retry several times until the message is received.

TABLE 4

| IP | UDP | CMD | SEQ | FILTER TABLE |
| --- | --- | --- | --- | --- |

The SEQ field (2 bytes) records the sequence number of this upload/update request. The FILTER TABLE field follows the same syntax as the filter table described above in Table 1. For the filter table update message, the value of the CMD field may be "2", "3", "4", or "5".

A value of "2" indicates an "upload" command. The upload command instructs the NEP 122 to upload the filters in the FILTER TABLE field of the message. If a personal filter table 322 already exists on the NEP 122, the NEP 122 replaces the entire existing personal filter table 322 with the filters contained in the message.

A value of "3" in the CMD field indicates an "add" command. The add command instructs the NEP 122 to add the filters in the FILTER TABLE field of the message to a personal filter table 322 existing on the NEP 122. If the rule sequence in the filter language is order sensitive, then the new filters are added at the beginning of the personal filter table 322 existing on the NEP 122.

A value of "4" in the CMD field indicates a "delete" command. The delete command instructs the NEP 122 to delete the filters in the FILTER TABLE field of the message from a personal filter table 322 existing on the NEP 122. A value of "5" in the CMD field indicates an "unload" command. The unload command instructs the NEP 122 to delete all filters from a personal filter table 322 existing on the NEP 122. For the unload command, the filters in the FILTER TABLE field of the message of are irrelevant. After the NEP 122 executes an unload command, the status for the terminal 102 stored on the NEP 122 should be changed to "EMPTY".

The third message is a filter table update acknowledgement message, shown in Table 5. For an update acknowledgement message, the CMD field is set to "6". The value for the STATUS field is "0" for a failure and "1" for success. The SEQ value should be copied from the corresponding filter table update message.

TABLE 5

| IP | UDP | CMD | SEQ | STATUS |
| --- | --- | --- | --- | --- |

For example, the terminal 102 may be initially authenticated to access the network 106 through the NEP 122. After the authentication, an "EMPTY" status for the terminal 102 may be stored in a memory of the NEP 122. An "EMPTY" status indicates that the NEP 122 has no filter table for the terminal 102. Later, the NEP 122 may receive a filter table update message to upload a personal filter table 322 or service filter table 302 for the terminal 102. After executing such an upload command, a "LOADED" status for the terminal 102 is stored in the memory of the NEP 122. Thereafter, the NEP 122 may send a filter table update acknowledgement message to the terminal 102 or the service policy server 116, as appropriate, indicating the "LOADED" status. In a similar manner, after an unload command, an "EMPTY" status for the terminal 102 is stored in the memory of the NEP 122 and indicated in a subsequent filter table update acknowledgement message.

The fourth message is a filter table upload redirection message, shown in Table 6. For a filter table upload redirection message, the CMD field is set to "7". The SEQ field is the sequence number of the message in the communication sequence. The oNEP ADDRESS field is the address of the original NEP 122.

TABLE 6

| IP | UDP | CMD | SEQ | oNEP ADDRESS |
| --- | --- | --- | --- | --- |

In operation, as the terminal 102 moves to the new domain 130, the new NEP 132 (nNEP) may send a filter table upload request message to the terminal 102. The terminal 102 may respond to the new NEP 132 with a filter table upload redirection message. This message may instruct the new NEP 132 to download the personal filter table 322 from the original NEP 122 (oNEP) rather than from the terminal 102. This action may take advantage of a faster connection between the NEPs 122 and 132. Upon receiving the filter table upload redirection message, the new NEP 132 may send a filter table upload request message to the original NEP 122.

The fifth message is a filter table transfer message. The format of the filter table transfer message is identical to the format of the filter table upload request message shown in Table 3. However, for the filter table transfer message the CMD field is set to "7", rather than to "0" or "1".

In operation, upon receiving a filter table upload redirection message, the new NEP 132 may send a filter table transfer message to the original NEP 122. Upon receiving the filter table transfer message, the original NEP 122 may send a filter table update message to transfer a filter table to the new NEP 132.

The sixth message is an access notification message, shown in Table 7. For a filter table transfer message, the CMD field is set to "8" or "9". If pending is required by a filter owned by the terminal 102, then the CMD field is set to "9". If pending is required by a filter owned by a domain administrator (including the home domain administrator), then the CMD field is set to "8". The SEQ field is again the sequence number of the message.

TABLE 7

| IP | UDP | CMD | SEQ | FIRST PACKET |
| --- | --- | --- | --- | --- |

The value for the FIRST PACKET field is a copy of the first packet of an unknown traffic flow. An unknown traffic flow is a traffic flow of packets that do not match the criteria of any rule in the integrated filter table 332 for the terminal 102. Alternatively, an unknown traffic flow is a traffic flow of packets that match a filter having an action of "pending".

In operation, the NEPs 122 and 132 protect the terminal 102 from unauthorized packets. The NEPs 122 and 132 may each receive incoming or outgoing packets designated to or from the terminal 102 which are an unknown traffic flow. When this occurs, the NEP 122 or 132 may send an access notification message to the terminal 102. The terminal 102, or other owner of a "pending" filter, may use the FIRST PACKET field to decide whether to accept, deny, or reject further packets from the traffic flow.

Upon receiving the access notification message, the terminal 102 may send a filter table update message to NEP 122 or 132 indicating what action the NEP 122 or 132 should take for this traffic flow. While NEP waiting for the reply from the terminal 102, the NEP 122 or 132 may either buffer or silently discard the packets of the traffic flow. After waiting for a threshold period of time and receiving no reply, the NEP 122 or 132 may discard all the packets from the traffic flow.

Figure 4:
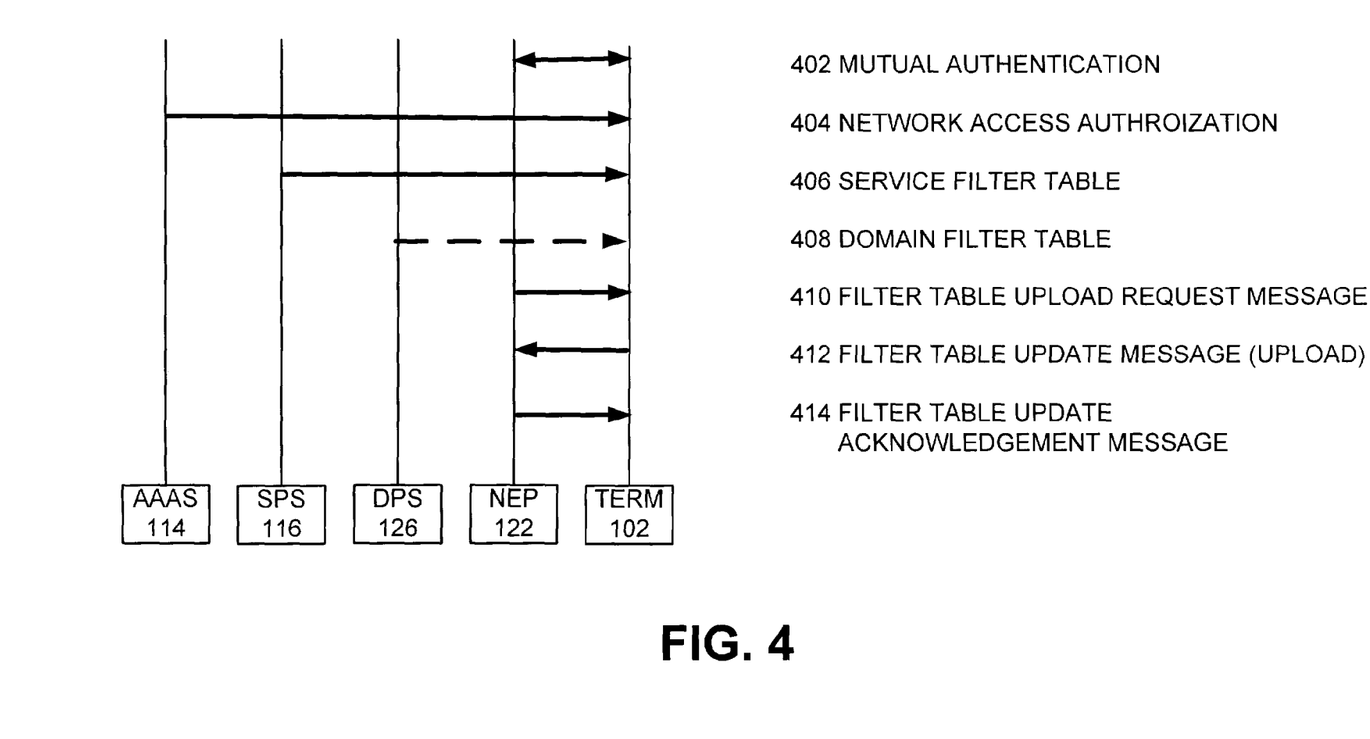
FIG. 4 shows a message sequence to initialize an integrated filter table when a terminal first associates with a network edge point.

FIG. 4 shows a message sequence to initialize the integrated filter table 332 when the terminal 102 first associates with the NEP 122. Message content may be encrypted to avoid eavesdropping. At 402, the terminal 102 and the NEP 122 become mutually authenticated. At 404, the terminal 102 is authorized to access the network 106 by the AAA server 114. If the status for terminal 102 stored in the NEP 122 is "EMPTY", then at 406 the NEP 122 downloads the service filter table 302 from the service policy server 116. At 408, the NEP 122 may download the domain filter table 312 from the domain policy server 126, if the domain filter table 312 is not already stored by the NEP 122. After the service filter table 302 and the domain filter table 312 are downloaded, the status for the terminal 102 stored on the NEP 122 may be updated to "LOADED".

At 410, the NEP 122 sends a filter table upload request message to the terminal 102. At 412, the terminal 102 responds to the NEP 122 with a filter table update message. The filter table update message response has a value of "1", indicating an "upload" command. At 414, the NEP 122 sends a filter table update acknowledgement message to the terminal 102.

Figure 5:
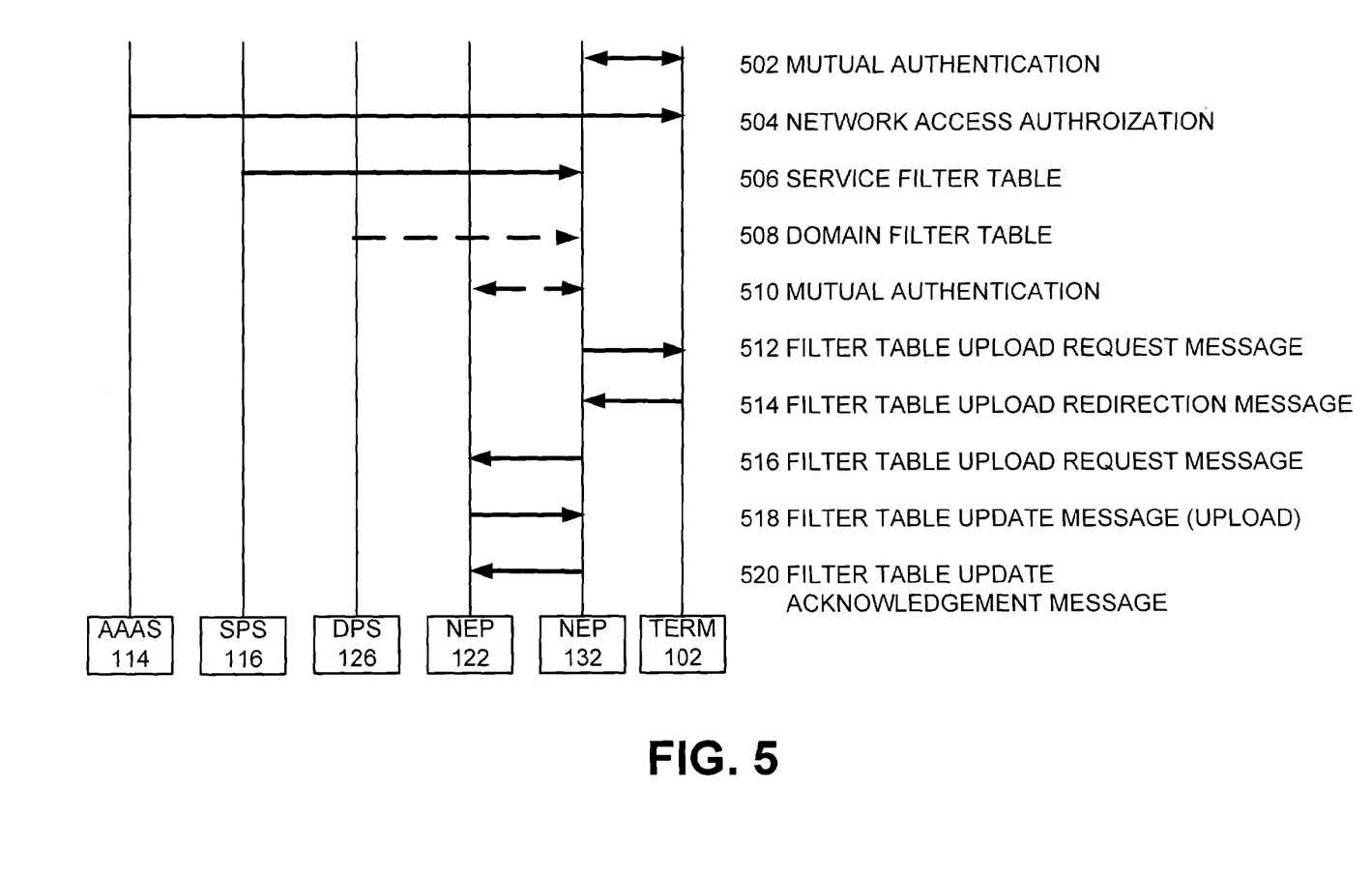
FIG. 5 shows a message sequence for transferring one or more filter tables from an original network edge point to a new network edge point as a terminal moves to a new domain.

FIG. 5 shows a message sequence for transferring one or more filter tables from the original NEP 122 to the new NEP 132 as the terminal 102 moves to the new domain 130. The communications between the new NEP 132 and the terminal 102 at 502, 504, 506, and 508 are essentially the same as the communications between the original NEP 122 as the terminal 102 at 402, 404, 406, and 408. At 510, the new NEP 132 and the original NEP 122 may mutually authenticate if they have not already done so. If the mutual authentication fails, then the new NEP 132 should download the personal filter table 322 from the terminal 102 with a filter table upload request message having the CMD field set to "1". Additionally, the new NEP 132 should download the service filter table 302 from the service policy server 116.

At 512, the new NEP 132 sends a filter table upload request message to the terminal 102. At 514, the terminal 102 responds to the NEP 122 with a filter table upload redirection message. At 516, the new NEP 132 sends a filter table upload request message to the original NEP 122. At 518, the original NEP 122 to the new NEP 132 with a filter table update message having a value of "2", indicating an "upload" command. Upon receiving the update message, the new NEP 132 should change the stored status for the terminal 102 to "LOADED". At 520, the original NEP 122 sends a filter table update acknowledgement message to the new NEP 132, and removes all filters associated with the terminal 102 stored on the original NEP 122.

Figure 6:
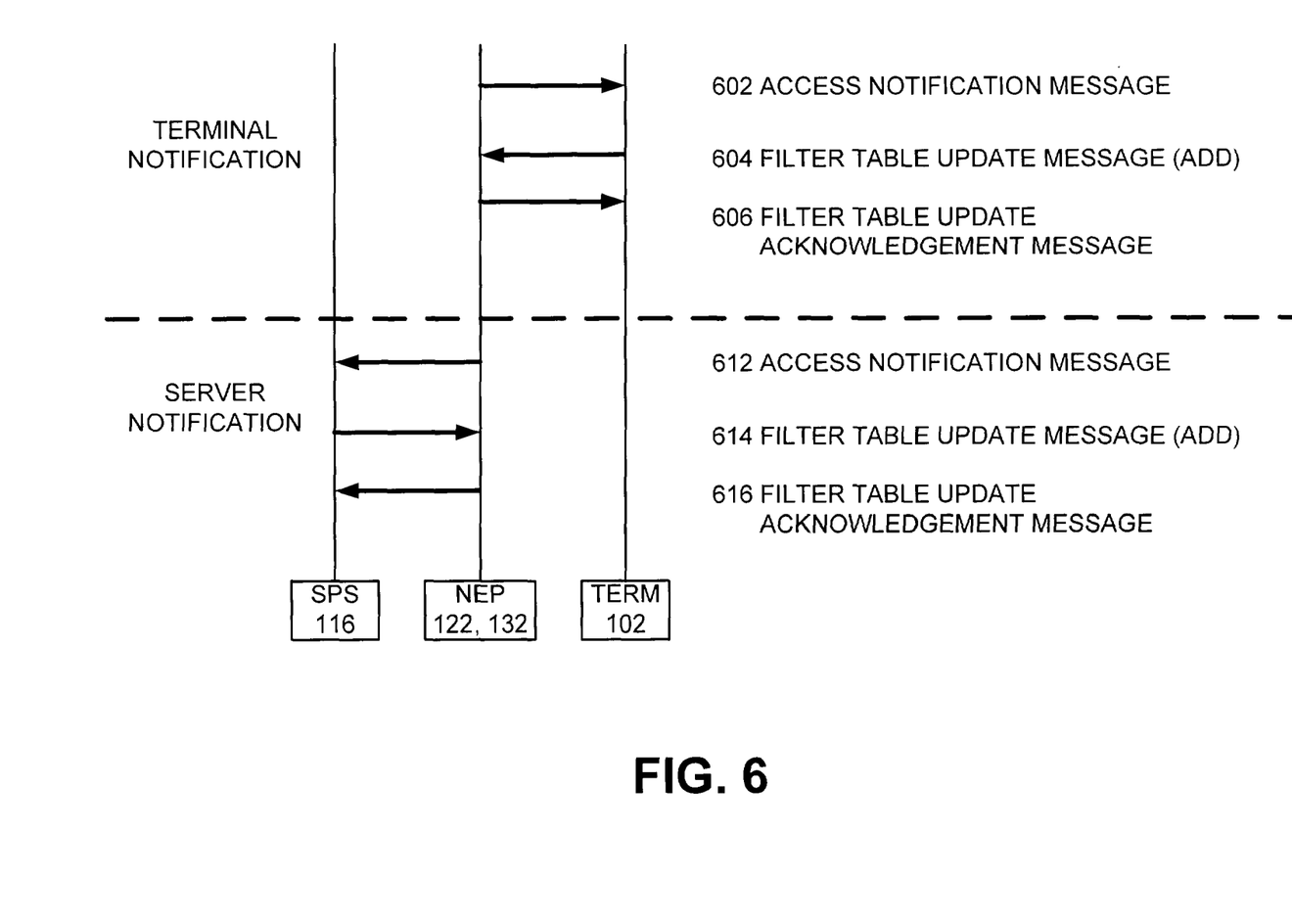
FIG. 6 shows a message sequence for notifying a terminal or a service policy server of unknown traffic.

FIG. 6 shows a message sequence for notifying the terminal 102 or the service policy server 116 of an unknown traffic flow. For notifying the terminal 102, at 602 the NEP 122 or 132 sends an access notification message to the terminal 102. The terminal 102 may update the personal filter table 322 with a new filter. The terminal 102 may respond to the NEP 122 or 132 with a filter table update message having a value of "2", indicating an "add" command. The filter table update message may contain the new filter, which may indicate whether to allow the unknown traffic flow. At 606, the NEP 122 or 132 sends a filter table update acknowledgement message to the terminal 102.

A nearly identical message sequence for notifying the service policy server 116 of an unknown traffic flow is shown in 612, 614, and 616. When the service policy server 116 receives access notification message, the service policy server 116 may parse the packet and determine whether the service being accessed is allowed by the user's service contract. Based on this determination, the service policy server 116 may decide whether the unknown traffic should be allowed or denied, and update the service filter table 302 accordingly.

The terminal 102 and the service policy server 116 may each need to be notified of an unknown traffic flow. If so, access notification messages may be sent to the terminal 102 and the service policy server 116 in any order. Furthermore, the NEP 122 or 132 need not wait for a reply from the first access notification message before sending the second access notification message. However, depending upon the network topology, it may be more advantageous to send the messages synchronously. For example, where the terminal 102 is a wireless terminal, to minimize wireless bandwidth usage it may be desirable to send the access notification message to the wired service policy server 116 first. After an "allow" response is received from the wired service policy server 116, a second access notification message may be sent to the wireless terminal 102. As another example, to minimize the time that network packets are blocked, it may be better to access notification messages to the terminal 102 and the service policy server 116 simultaneously.

For policy enforcement, the NEP 122 or 132 with which the terminal 102 is associated is responsible for checking each incoming and outgoing packet and applying the filters each packet. The NEPs 122 and 132 may first apply administrator owned filters, including domain filters and service filters. Next, the NEPs 122 and 132 may apply a sender's personal filters to outbound packets and a receiver's personal filters to inbound packets. One of four actions may be applied to each incoming or outgoing packet. The action "allow" indicates a packet may pass through. The action "reject" indicates a packet will be dropped with a notification message sent to the user. The action "deny" indicates a packet will be dropped silently, with no notification message. If a packet matches "pending" criteria, the NEPs 122 and 132 may notify the user with an access notification message, as shown above in FIG. 6.

Each NEP 122 and 132 may have a set of default filters. A preferred set of default filters is as follows. First, allow the terminal 102 to communicate with the NEP 122 or 132, the AAA server 114, and any other servers required for authorization and authentication. Second, allow the terminal 102 to communicate with the NEP 122 or 132 using the message set described herein. Third, allow the terminal 102 to communicate using other ports and protocols to enable local routing, such as address resolution protocol (ARP).

The default personal filter table 322 set for each terminal 102 may be defined by the individual users thereof. The default service filter table 302 may be defined by the administrator of the home domain 110, preferably according to the service contract between the user and the service provide. The default domain filter table 312 may be defined by the administrator of the original domain 120 or the new domain 130, respectively.

Several scenarios utilizing the present invention will now be described. In the first scenario, the terminal 102 proactively updates the personal filter table 322. The terminal 102 is about to upload a file to an FTP server. The user of the terminal 102 may only want to enable FTP traffic between the terminal 102 and the FTP server. An FTP client on the terminal 102 may change the personal filter table 322 to allow packets bound for TCP port 21 between the FTP server's address and the address of the terminal 102. The terminal 102 may then proactively upload this new filter to the NEP 122 or 132.

In the second scenario, the terminal 102 is protected from unknown traffic access by filter in the personal filter table 322. The terminal 102 may have a filter in the personal filter table 322 with an action of "pending" for unknown traffic. A malicious corresponding terminal 104 may attempt to initiate a TCP connection with the terminal 102. The malicious corresponding terminal 104 may attempt to jam network bandwidth to the terminal 102. When the hostile traffic from the malicious corresponding terminal 104 reaches the NEP 122 or 132, the NEP 122 or 132 will send an access notification message to the terminal 102. The terminal 102 may decide whether to allow or deny the unknown traffic based on the information provided in the notification message, and to update the personal filter table 322 passively.

In the third scenario, traffic to the terminal 102 is controlled by service policy server 116. For example, the terminal 102 is a media server, and corresponding terminal 104 attempts to download a pay-per-view movie. The owner of the media server may have business contract with the service provider to share the profit from such downloading. For example, the owner of the media server may rely on a user database of the service provider. This frees the owner of the media server from maintaining a user subscription and profile database.

In this scenario, the terminal 102 may set a filter in the personal filter table 322 to allow incoming traffic from any terminal through a predefined media downloading service port. Additionally, a filter in the service filter table 302 may filter be set to "pending" for such traffic. Upon receiving an access notification message from the NEP 122 or 132, the service policy server 116 may determine whether the accessing user has paid for the movie, or if other conditions are met based on the service contract. If all conditions are met, the service policy server 116 may add a filter to the service filter table 302 on the NEP 122 or 132 to allow the traffic.

In the fourth scenario, unknown traffic is controlled by the terminal 102 and the service policy server 116. A user of the terminal 102 may want to play a peer-to-peer game only with certain other users. A filter in the personal filter table 322 for the game port may be set to "pending". A filter in the service filter table 302 for the game port may also be set to "pending", because, for example, different games may have different associated costs.

When a foreign user want to initiate a new game with the terminal 102, both the terminal 102 and the service policy server 116 will be notified. The service policy server 116 will decide whether to allow or deny such game traffic based on a service contract. The terminal 102 may decide to accept or deny the game traffic based on the identity of the foreign user. After the terminal 102 and the service policy server 116 both decide to accept the game traffic, the distributed game may be enabled.

While various embodiments of the invention have been described, it will be apparent to those of ordinary skill in the art that many more embodiments and implementations are possible that are within the scope of this invention. Accordingly, the invention is not to be restricted except in light of the attached claims and their equivalents.

What is claimed is:

1. A network system comprising:
   a network, wherein the network includes a network edge point configured to provide access to the network; and
   a terminal, wherein the terminal is coupled to the network edge point and communicates with the network via the network edge point;
   wherein the network edge point has a security policy that includes a personal filter which is provided by the terminal and which is applicable exclusively to the terminal and which customizes the security policy for network communications between the network and the terminal.

2. The network system of claim 1, wherein the network edge point integrates the personal filter into the security policy.

3. The network system of claim 2, wherein the personal filter is defined by a user of the terminal.

4. The network system of claim 1, wherein the personal filter replaces a default filter defined by a network administrator.

5. The network system of claim 1, wherein the network edge point includes a domain filter, and the network edge point integrates the domain filter into the security policy.

6. The network system of claim 1, further including a domain policy server coupled to the network, wherein the domain policy server includes a domain filter, the domain policy server transmits the domain filter to the network edge point, and the network edge point integrates the domain filter into the security policy.

7. The network system of claim 1, further including a service policy server coupled to the network, wherein the service policy server includes a service filter, the service policy server transmits the service filter to the network edge point, and the network edge point integrates the service filter into the security policy.

8. The network system of claim 1, wherein the security policy is an integrated filter table comprising a personal filter received from the terminal and a service filter received from a service policy server.

9. The network system of claim 8, wherein the integrated filter table further comprises a domain filter received from a domain policy server.

10. A method of securing communications in a network, comprising the steps of:
sending a service filter from a service policy server to a network edge point;
sending a personal filter from a terminal to the network edge point, the personal filter being applicable exclusively to the terminal, customizing a security policy that governs communications between the terminal and the network at the network edge point;
integrating the service filter and the personal filter into an integrated filter table; and
filtering traffic to the terminal at the network edge point according to the integrated filter table.

11. The method of claim 10, wherein the service filter is enforced if the service filter and the personal filter conflict.

12. The method of claim 10, further including the step of sending an access notification message to the terminal in response to unknown traffic arriving at the network edge point.

13. The method of claim 12, further including the steps of sending a second personal filter to the network edge point in response to the access notification message, and integrating the second personal filter into the integrated filter table.

14. The method of claim 10, further including the step of sending an access notification message to the service policy server in response to unknown traffic arriving at the network edge point.

15. The method of claim 14, further including the steps of sending a second service filter to the network edge point in response to the access notification message, and integrating the second service filter into the integrated filter table.

16. The method of claim 10, wherein the personal filter includes an internet protocol address.

17. The method of claim 10, wherein the personal filter includes a media access control address.

18. The method of claim 10, wherein the service filter includes a service access port, further including the step of sending an access notification message to the service policy server in response to traffic including the service access port arriving at the network edge point.

19. The method of claim 18, further including the step of tracking the traffic for billing purposes in response to the access notification message.

20. A method of securing communications in a network, comprising the steps of:
sending a personal filter from a terminal to a first network edge point, the personal filter being applicable exclusively to the terminal, customizing a security policy that governs communications between the terminal and the network at the network edge point;
sending the personal filter from the first network edge point to a second network edge point, when the terminal hands-off from the first network edge point to the second network edge point; and
filtering traffic to the terminal at the second network edge point according to the personal filter.

21. The method of claim 20, further including the step of mutually authenticating the terminal and the first network edge point.

22. The method of claim 20, further including the step of authenticating the terminal with the second network edge point.

23. The method of claim 20, further including the step of authenticating the first network edge point with the second network edge point.

24. The method of claim 20, further including the step of filtering traffic at the first network edge point according to the personal filter.

25. The method of claim 20, further including the steps of sending a service filter from a service policy server to the first network edge point, sending the service filter from the first network edge point to the second network edge point, and filtering traffic at the second network edge point according to the service filter.

26. The method of claim 20, wherein the step of sending the personal filter from the first network edge point to the second network edge point further includes sending the personal filter after authenticating the terminal with the second network edge point.

* * * * *